United States Patent [19]

Blum

[11] Patent Number: 5,401,421

[45] Date of Patent: Mar. 28, 1995

[54] ENERGY EFFICIENT WATER PURIFICATION SYSTEM

[76] Inventor: Robert Blum, 364 Maple Ave., Harleysville, Pa. 19438

[21] Appl. No.: 72,596

[22] Filed: Jun. 3, 1993

[51] Int. Cl.$^6$ .............................................. B01D 37/04
[52] U.S. Cl. ...................................... 210/742; 210/149; 210/259; 210/409; 210/418; 210/646; 210/797
[58] Field of Search .................. 210/85, 96.2, 149, 259, 210/269, 321.69, 407, 418, 182, 184, 636, 646, 652, 663, 670, 742, 774, 806, 929, 332, 409, 797, 295, 662; 604/4-6

[56] References Cited

U.S. PATENT DOCUMENTS

| | | | |
|---|---|---|---|
| 2,332,995 | 10/1943 | Eaton | 137/896 |
| 3,352,779 | 11/1967 | Austin et al. | 210/646 |
| 4,617,115 | 10/1986 | Vantard | 210/96.2 |
| 4,804,474 | 2/1989 | Blum | 210/641 |
| 5,093,012 | 3/1992 | Bundy et al. | 210/765 |
| 5,203,496 | 4/1993 | Kline | 137/896 |
| 5,336,165 | 8/1994 | Twardowski | 210/646 |

FOREIGN PATENT DOCUMENTS

| | | | |
|---|---|---|---|
| 903678 | 6/1972 | Canada | 210/646 |
| 451429 | 10/1991 | European Pat. Off. | 604/5 |

*Primary Examiner*—Joseph W. Drodge
*Attorney, Agent, or Firm*—Dann, Dorfman, Herrell and Skillman

[57] ABSTRACT

An energy efficient water purification system which maintains critical operating temperatures for effective reverse osmosis. The system includes hot and cold water inlets providing a flow of heated feed water, a regeneratable pre-treatment system for treating the heated feed water, a reverse osmosis machine for receiving the flow of pre-treated feed water heated to a given temperature to purify the feed water and discharge impurities in a discharge stream and feed the purified feed water to an outlet for end use, and a valve to control the temperature of the heated feed water entering the pre-treatment system, and an energy conserving apparatus comprising a valve arrangement which interrupts the heated water flow into the pre-treatment system and substitutes fresh unheated feed water during regeneration.

8 Claims, 1 Drawing Sheet

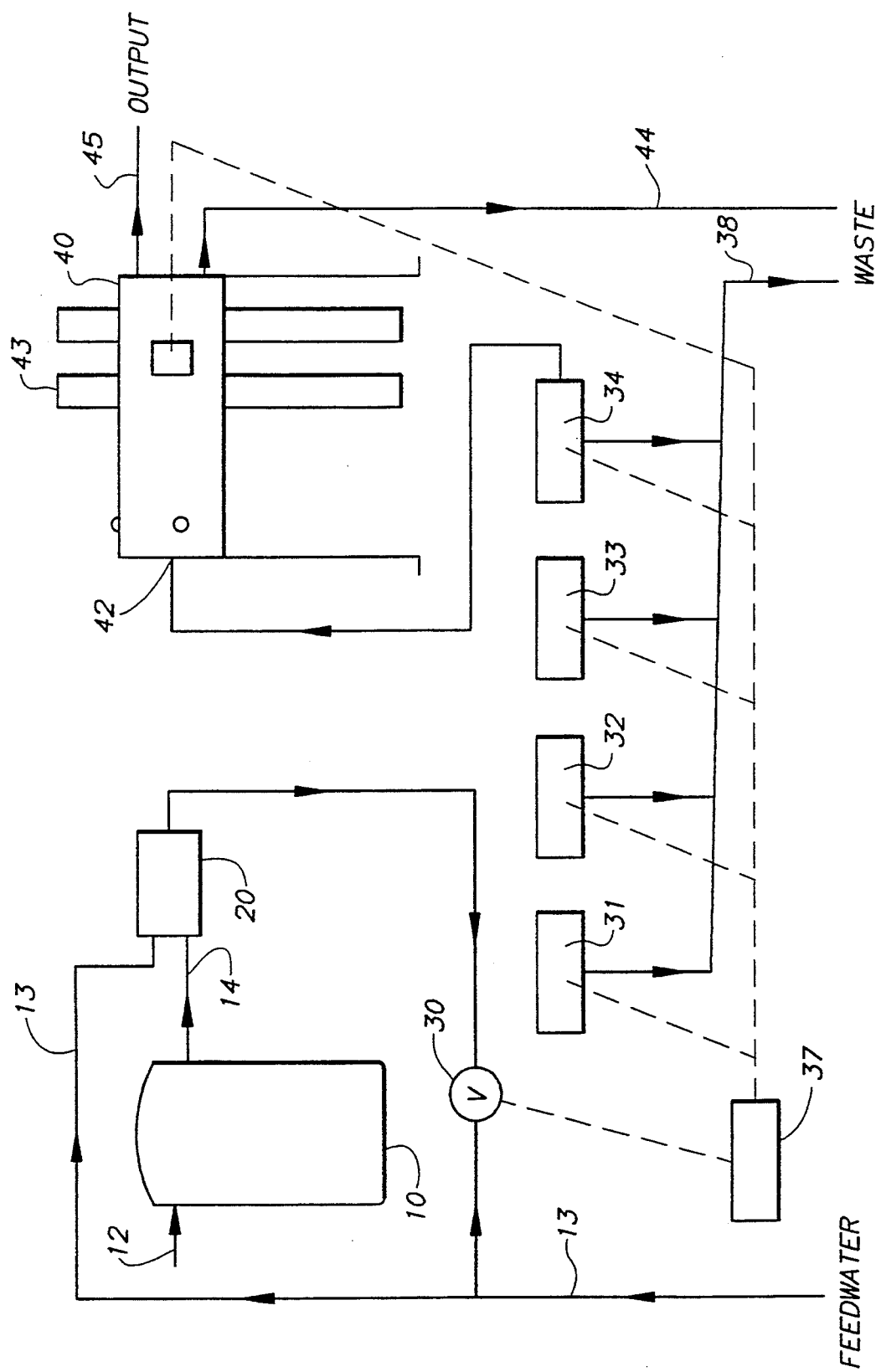

ENERGY EFFICIENT WATER PURIFICATION SYSTEM

FIELD OF THE INVENTION

The present invention relates to an energy efficient water purification system for water treatment USING a reverse osmosis machine.

BACKGROUND OF THE INVENTION

In reverse osmosis machines, the water is pre-treated by being caused to flow through a succession of units, consisting of a sediment filter, a water softener and carbon filters. The pre-treated water is then fed to the reverse osmosis machine where it is purified for its end use.

Periodically, normally during off-peak operations of the machine, timing devices for the pre-treatment devices of the system operate to cause each piece of equipment to go through its regeneration or flushing mode. The system normally causes the flow through the unit to be reversed so that the reverse flow causes the contaminants removed by the unit to be discharged from the system. After the flushing or regeneration, the unit is returned to its normal operation.

In conventional systems, the operation of each unit is automatically timed to flush during an off-peak period, by reversing the flow of the water through the piece of equipment and diverting the effluent to waste.

In a water purification system having a low demand, the reverse osmosis machine may operate with feed water at its normal supply temperature. However, where the demand for purified water is high, efficient operation of the reverse osmosis machine requires that the temperature of the water be heated to about 77° F., which is the optimum temperature for operation of the membranes in the reverse osmosis machine. The temperature of the water is normally elevated by mixing fresh unheated water with heated water in a proportion to achieve a 77° temperature at the input to the reverse osmosis machine. The standard practice is to mix the hot and cold water to adjust the temperature in advance of the pre-treatment units. Thus, the water flowing through the pre-treatment units is controlled as to its temperature to assure 77° water entering the reverse osmosis machine.

SUMMARY OF THE INVENTION

The present invention provides a mechanism for effecting a considerable saving in energy during the regeneration period.

More specifically, the present invention provides for interrupting the temperature control of the water flowing through the units during the periods when regeneration is being effected.

The interruption of the temperature control is preferably achieved by cutting off the flow of hot water and substituting a flow of fresh water to the pre-treatment units during regeneration.

BRIEF DESCRIPTION OF THE DRAWINGS

All of the objects of the invention are more fully set forth hereinafter with reference to the following description when taken in conjunction with the drawing, in which:

The Figure is a schematic diagram of a water purification system embodying pre-treatment units for the water, all controlled in accordance with the present invention.

DESCRIPTION OF THE PREFERRED EMBODIMENT

Referring now to the drawing, there is shown generally an energy efficient water purification system including a cold water inlet 13; a hot water inlet 12 for causing a flow of feed water into the water purification system and a heater 10 to heat the flow of water from the hot water inlet 12; means to adjust the temperature of the water, in the present case a blending valve 20; a pre-treatment system comprising, for example, a sediment filter unit 31, a water softener unit 32, and carbon filter units 33 and 34; a reverse osmosis machine 40 having an inlet port 42 for receiving the flow of heated water at a given temperature to filter the water and discharge impurities therefrom; and a purified water outlet 45 for discharging the purified water from the reverse osmosis machine to the end use area.

Referring now to the figure, the heater 10 heats the flow of water entering the water purification system through the hot water inlet 12, the hot water inlet line discharges the heated water in a hot water stream 14 to the blending valve 20 where the hot water is blended with a flow of water from the cold water inlet line 13. In the present instance, the hot water heater 10 is of the electric type. The blending valve 20 is controlled by a thermal sensor in the valve to maintain the temperature of the water at the critical temperature of 77° F., the thermal sensor actuates the blending valve 20 such that the heated flow of water from the hot water inlet line is increased relative to the flow of water from the cold water inlet line 13.

In addition, when the temperature of the water from the hot water inlet 12 rises above the given temperature, the thermal sensor actuates the valve 20 to add cold water in the valve 20 where the temperature is modulated to achieve the aforesaid critical temperature. It is essential that the temperature of the water remain at 77° F. for optimal operation of the reverse osmosis machine 40.

The heated water flowing from the valve 20 is pre-treated and, to this end, the flow from the valve 20 is directed through a three-way valve 30 to the first of a succession of pre-treatment units, namely a sediment filter 31. The valve 30 has one inlet port, normally open, connected to the valve 20, a second inlet port, normally closed, connected to the cold water inlet 13, and an outlet port, always open, connected to the pre-treatment system. The water is successively passed through the water softener 32 and the carbon filters 33 and 34 to the inlet 42 of the reverse osmosis machine 40.

The reverse osmosis machine 40 receives the flow of hot water from the blending valve 20 to purify the water and discharge impurities therefrom in a drainage stream 44. The reverse osmosis machine 40 includes a membrane 43 to filter the water, discharging the purified water into a product stream through the outlet 45. Approximately 50% of the water is discharged to the drainage stream 44 and the other 50% of the water continues on into the product stream for its ultimate end use.

Water purification systems using a reverse osmosis machine are required to purify the water for kidney dialysis machines, but are more widely used where a high degree of water purification is desirable as in hospitals, laboratories, manufacturing operations having water systems where the feed water is contaminated, odoriferous or otherwise not suitable for conventional water treatment equipment. For systems requiring a low output, the temperature control may be omitted for economic reasons.

Periodically, the pre-treatment units 31, 32, 33 and 34 must be regenerated. Typically, the regeneration occurs during off-peak operation and consists of a reverse flush or backwash of each unit. Prior to the present invention, each unit operated independently of the others in accordance with its own controls to flush and backwash during a quiet period, for example during off-peak hours when no water purification operation is running. A normal back-flushing of the pre-treatment system may use in excess of 1000 gallons of water per regeneration, and it has been found that a considerable energy loss results by the use of water heated at 77° to achieve the backwashing. It has been found that the backwashing of the pre-treatment devices is substantially fully effective with backwashing with fresh unheated water. By eliminating the need to use heated water in flushing the pre-treatment units 31–34, a considerable saving in heat energy is achieved.

In accordance with the present invention, the three-way valve 30 is connected to the fresh water inlet 13 so as to enable the valve to be operated to bypass the heating system including the hot water inlet 12, the heater 10 and the blending valve 20. In some installations, it may be desirable to use two separate valves in place of a three-way valve so as to minimize the chance of leakage of unheated water into the operating system. In other installations, it may be preferred to control the blending valve 20 to interrupt the flow of hot water through the blending valve so that the blending valve discharges cold water to the pre-treatment units 31–34 during the flushing operation.

In any event, the flow of hot water to the pre-treatment units 31–34 is interrupted during the flushing period and fresh water is used for the flushing operations. To accomplish this, a control box 37 is coupled to the valve and the pre-treatment units 31–34 so that all of the devices are flushed with cold water rather than heated water. The box also includes a connection to the reverse osmosis machine 40 to disable the machine during the regeneration and avoid inadvertent start-up. During the flushing operations, the flushing water is discharged to a drain line 38.

Some of the many advantages and novel features of the invention should now be apparent in view of the foregoing description and accompanying drawings. For example, a conventional water purification system has been described which consists of fluid inlets for causing a flow of water, a reverse osmosis machine for receiving the flow of water and having a membrane operable at a first given temperature to purify the water and discharge impurities therefrom in a discharge stream, and an outlet receiving the purified water from the reverse osmosis machine, and a valve to control the temperature of the water entering the reverse osmosis machine at the first given temperature. The improved apparatus for conserving energy comprises an unheated fluid inlet to introduce fresh water through the pre-treatment units during their regeneration cycles. By using the method and apparatus of the invention, the energy required to operate the hot water heater is substantially curtailed, thus resulting in significant savings in the cost of operating a water purification system.

It is understood that the invention is not limited to the particular embodiment which is disclosed, but is intended to include all modifications and changes which are within the scope and spirit of the invention as defined by the appended claims.

We claim:

1. A water purification system having fluid inlet means for introducing a flow of feed water fluid, water pre-treatment means for treating the flow of feed water to remove contaminants, said pre-treatment means including at least one unit which may be regenerated by flushing, a reverse osmosis machine arranged for receiving said flow of pre-treated feed water and having a membrane operable at a given temperature to purify said feed water and discharge impurities therefrom in a discharge stream therefrom, at least one output receiving the purified feed water from said reverse osmosis machine and sensor means for controlling the temperature of the flow of feed water entering the pre-treatment means to maintain the feed water at said given temperature;

the system further comprising control means for interrupting the flow of controlled temperature fed water to said pre-treatment means during a period for regeneration of said pre-treatment means and introducing unheated feed water to said pre-treatment means during said regeneration, whereby said one pre-treatment unit is regenerated by flushing with unheated water.

2. A system according to claim 1, wherein said control means comprises valve means having a normally-open port arranged for controlling the flow of feed water from said control means and a normally-closed port connected to the fluid inlet means, and means operable to close said normally-open port and open said normally-closed port during said regeneration period.

3. A system according to claim 2 wherein said sensor means comprises a mixing valve having a heated water outlet, said normally open port of said valve means being connected to said heated water outlet port during said regeneration period.

4. A system according to claim 1, wherein said pre-treatment means comprises a sediment filter unit, a water softener unit, and at least one carbon filter unit, each of said units being capable of regeneration by flushing.

5. A system according to claim 1 including means operable to disable the reverse-osmosis machine upon interruption of the flow of controlled temperature feed water.

6. A method of conserving energy in a water purification system having fluid inlet means for introducing flows of heated feed water and fresh water into the system, sensing means for controlling the temperature of the flow of heated feed water from said inlet means to a given temperature, a reverse osmosis machine receiving said flow of heated feed water and having a membrane operable at said given temperature to purify said heated feed water and discharge impurities therefrom, at least one output receiving the purified feed water from said reverse osmosis machine, and a regeneratable water pre-treatment system in advance of said reverse osmosis machine to remove contaminants from the heated feed water prior to entry into said reverse osmosis machine, said method consisting of the steps of controlling the temperature of the feed water in advance of the pre-treatment system, interrupting the flow of heated feed water to said pre-treatment system and introducing the flow of fresh water into said pre-treatment system during regeneration for regenerating said pre-treatment system.

7. A method according to claim 6 wherein said regeneratable water pre-treatment system includes a plurality of units, said regenerating step being performed on all units of the pre-treatment system within an off-peak time period.

8. A method according to claim 7 including the step of disabling the reverse osmosis machine upon interruption of the flow of heated feed water.

* * * * *

UNITED STATES PATENT AND TRADEMARK OFFICE
CERTIFICATE OF CORRECTION

PATENT NO. : 5,401,421

DATED : March 28, 1995

INVENTOR : Robert Blum

It is certified that errors appear in the above-identified patent and that said Letters Patent is hereby corrected as shown below:

Column 4, Line 23, "fed" should be --feed--;

Lines 40-41, delete "port during said regeneration period".

Signed and Sealed this

Thirtieth Day of May, 1995

Attest:

BRUCE LEHMAN

Attesting Officer     Commissioner of Patents and Trademarks